United States Patent
England

(10) Patent No.: US 8,343,401 B2
(45) Date of Patent: Jan. 1, 2013

(54) FILTRATION MEDIA HAVING RECYCLED WASTE MATERIALS

(75) Inventor: William G. England, Suwanee, GA (US)

(73) Assignee: Purafil, Inc., Doraville, GA (US)

( * ) Notice: Subject to any disclaimer, the term of this patent is extended or adjusted under 35 U.S.C. 154(b) by 20 days.

(21) Appl. No.: 13/080,127

(22) Filed: Apr. 5, 2011

(65) Prior Publication Data

US 2011/0316186 A1 Dec. 29, 2011

Related U.S. Application Data

(60) Provisional application No. 61/321,922, filed on Apr. 8, 2010.

(51) Int. Cl.
*B29C 47/00* (2006.01)
*B01D 39/20* (2006.01)

(52) U.S. Cl. .................................. 264/115; 264/109

(58) Field of Classification Search ..................... None
See application file for complete search history.

(56) References Cited

U.S. PATENT DOCUMENTS

| 6,194,065 | B1 | 2/2001 | Golan |
| 2008/0127822 | A1* | 6/2008 | England .................. 95/132 |
| 2008/0182748 | A1 | 7/2008 | Osborne et al. |
| 2009/0246107 | A1* | 10/2009 | England .................. 423/230 |

FOREIGN PATENT DOCUMENTS

| WO | 2008011641 | 1/2008 |
| WO | 2009120744 | 10/2009 |
| WO | 2011127008 | 10/2011 |

OTHER PUBLICATIONS

PCT/US2011/031168, International Search Report and Written Opinion, Aug. 19, 2011, 14 pages.
PCT/US2011/031168, "International Preliminary Report on Patentability", Oct. 18, 2012, 9 pages.

* cited by examiner

*Primary Examiner* — Mary F Theisen
(74) *Attorney, Agent, or Firm* — Kilpatrick Townsend & Stockton LLP

(57) ABSTRACT

A method for forming a filtration media from waste media includes combining the waste media with a binder to form a dry mixture, adding a liquid composition to the dry mixture to form a slurry, and extruding the slurry to form a filtration media. The waste media may include fines or oversized media resulting from a prior media production process that have been subjected to a hydration process. The waste media may be ground and sized prior to combining it with the binder. The binder may include clay, cellulose materials, and combinations thereof. The liquid composition may include water and optionally one or more additional additives selected from the group consisting of permanganates, acids, bases, amines and combinations thereof. In one embodiment, the slurry is extruded into a honeycomb matrix.

20 Claims, No Drawings

FILTRATION MEDIA HAVING RECYCLED WASTE MATERIALS

CROSS REFERENCE TO RELATED APPLICATION

This application claims the benefit of U.S. Provisional application Ser. No. 61/321,922, filed Apr. 8, 2010, the entire contents of which are incorporated herein by reference.

FIELD OF THE INVENTION

The methods provided herein relate generally to methods for forming filtration media for the removal of compounds having disagreeable odors, toxic properties or corrosive properties from gaseous streams. The methods more particularly relate to methods for making the filtration media by incorporating into the media recycled filtration media waste products resulting from filtration media production processes.

BACKGROUND OF THE INVENTION

The removal of toxic, corrosive and odorous gases can be accomplished by a number of techniques. These may include wet scrubbing, incineration, and removal via gas-phase air filtration using a variety of dry scrubbing adsorptive, absorptive, and/or chemically impregnated media. As opposed to these other methods, gas-phase air filtration does not require the consumption of large quantities water or fuel. Dry-scrubbing media can be engineered from a number of common adsorbent materials with or without chemical additives for the control of a broad spectrum of gases or tailored for specific gases.

In contrast to the reversible process of physical adsorption, chemical adsorption, also referred to as chemisorption, is the result of chemical reactions on the surface of the media. This process is specific and depends on the physical and chemical nature of both the media and the gases to be removed. Some oxidation reactions can occur spontaneously on the surface of the adsorbent, however, a chemical impregnant is usually added to the media. The impregnant imparts a higher contaminant removal capacity and can lend some degree of specificity. Although some selectivity is apparent in physical adsorption, it can usually be traced to purely physical, rather than chemical, properties. In chemisorption, stronger molecular forces are involved, and the process is generally instantaneous and irreversible.

Undesirable airborne compounds, including sulfur compounds, such as hydrogen sulfide and dimethyl sulfide, ammonia, chlorine, formaldehyde, urea, carbon monoxide, oxides of nitrogen, mercaptans, amines, isopropyl alcohol and ethylene, occur in a number of environments, where most are primarily responsible for the presence of disagreeable odors, or irritating or toxic gases. Such environments include petroleum treatment and storage areas, sewage treatment facilities, hospitals, morgues, anatomy laboratories, animal rooms, and pulp and paper production sites, among others. These undesirable compounds may be bacterial breakdown products of higher organic compounds, or simply byproducts of industrial processes.

Hydrogen sulfide ("$H_2S$"), a colorless, toxic gas with a characteristic odor of rotten eggs, is produced in coal pits, gas wells, sulfur springs, and from decaying organic matter containing sulfur. Controlling emissions of this gas, particularly from municipal sewage treatment plants, has long been considered desirable. More recently, protecting electronic apparatus from the corrosive fumes of these compounds has become increasingly important. Furthermore, $H_2S$ is flammable.

Ammonia ("$NH_3$") is also a colorless gas. It possesses a distinctive, pungent odor and is a corrosive, alkaline gas. The gas is produced in animal rooms and nurseries, and its control also has long been considered important.

Chlorine ("$Cl_2$") is a greenish-yellow gas with a suffocating odor. The compound is used for bleaching fabrics, purifying water, treating iron, and other uses. Control of this powerful irritant is necessary for the well-being of those who work with it or are otherwise exposed to it. At lower levels, in combination with moisture, chlorine has a corrosive effect on electronic circuitry, stainless steel and the like.

Formaldehyde ("$OCH_2$") is a colorless gas with a pungent, suffocating odor. It is present in morgues and anatomy laboratories, and because it is intensely irritating to mucous membranes, its control is necessary.

Urea ("$OC(NH_2)_2$") is present in toilet exhaust and is used extensively in the paper industry to soften cellulose. Its odor makes control of this compound important.

Carbon monoxide ("CO"), an odorless, colorless, toxic gas, is present in compressed breathing air. Oxygenation requirements for certain atmospheres, including those inhabited by humans, mandate its control.

Oxides of nitrogen, including nitrogen dioxide ("$NO_2$"), nitric oxide ("NO"), and nitrous oxide ("$N_2O$"), are compounds with differing characteristics and levels of danger to humans, with nitrous oxide being the least irritating oxide. Nitrogen dioxide, however, is a deadly poison. Control of pollution resulting from any of these oxides is desirable or necessary, depending on the oxide.

Mercaptans and amines, including methyl mercaptan ("$CH_3SH$"), butyl mercaptan ("$C_4H_9SH$") and methyl amine ("$CH_3NH_2$"), are undesirable gases present in sewerage odor. The control of these gases is desired for odor control.

Isopropyl alcohol ("$(CH_3)_2CHOH$") is a flammable liquid and vapor. Inhalation of the vapor is known to irritate the respiratory tract. Furthermore, exposure to high concentrations of isopropyl alcohol can have a narcotic effect, producing symptoms of dizziness, drowsiness, headache, staggering, unconsciousness and possibly death. The control of this vapor in print processing and industrial synthesis is desired.

Ethylene ("$C_2H_4$") is a colorless, flammable gas. It is a simple asphyxiant that accelerates the maturation or decomposition of fruits, vegetables, and flowers. Control of this compound prolongs the marketable life of such items.

The airborne compounds described above can have a detrimental effect on the local environment. For example, acidification is caused by emissions of sulfur dioxide and nitrogen compounds (nitrogen oxides and ammonia), which in turn cause acid rain. Furthermore, nitrogen oxides and volatile organic compounds from vehicular traffic, electricity and heat production, as well as from industrial facilities may, under certain conditions, contribute to the formation of photochemical oxidants, among which ozone is the dominating substance. Ozone is a colorless gas that forms when nitrogen oxides mix with hydrocarbons in the presence of sunlight. In addition to causing environmental damage, ozone poses a health hazard, particularly for children, the elderly and individuals with asthma or lung disease.

Solid filtration media for removing the undesirable compounds described above are known. Generally described, the filtration media contain a substrate impregnated with high levels of permanganate. The permanganate is typically a permanganate salt such as sodium permanganate ("$NaMnO_4$"), magnesium permanganate ("$Mg(MnO_4)_2$"), calcium permanganate ("Ca(MnO$_4$)$_2$"), barium permanganate ("Ba(MnO$_4$)$_2$") and lithium permanganate ("LiMnO$_4$").

The substrate is typically formed from one or more of the following: activated alumina, silica gels, zeolites, adsorbent clays and activated bauxite. A preferred porous substrate is alumina. Preferably, the concentration of substrate in the filtration media is from about 40 to 80%, and most preferably is from about 60 to 75% in the absence of sodium bicarbonate and from about 40 to 60% if the media contain sodium bicarbonate.

Another preferred porous substrate is a combination of alumina and a zeolite, in which up to about 50% by weight of the porous substrate combination is a zeolite. Though not intending to be bound by this statement, it is believed that zeolites further control the moisture content of the filtration media by attracting and holding water, which functions to keep more of the impregnate in solution. This effect, in turn, is believed to enhance the high capacity and improved efficiency of the filtration media. As used herein, the term zeolite includes natural silicate zeolites, synthetic materials and phosphate minerals that have a zeolite-like structure. Examples of zeolites that can be used in this media include, but are not limited to, amicite (hydrated potassium sodium aluminum silicate), analcime (hydrated sodium aluminum silicate), pollucite (hydrated cesium sodium aluminum silicate), boggsite (hydrated calcium sodium aluminum silicate), chabazite (hydrated calcium aluminum silicate), edingtonite (hydrated barium calcium aluminum silicate), faujasite (hydrated sodium calcium magnesium aluminum silicate), ferrierite (hydrated sodium potassium magnesium calcium aluminum silicate), gobbinsite (hydrated sodium potassium calcium aluminum silicate), harmotome (hydrated barium potassium aluminum silicate), phillipsite (hydrated potassium sodium calcium aluminum silicate), clinoptilolite (hydrated sodium potassium calcium aluminum silicate), mordenite (hydrated sodium potassium calcium aluminum silicate), mesolite (hydrated sodium calcium aluminum silicate), natrolite (hydrated sodium aluminum silicate), amicite (hydrated potassium sodium aluminum silicate), garronite (hydrated calcium aluminum silicate), perlialite (hydrated potassium sodium calcium strontium aluminum silicate), barrerite (hydrated sodium potassium calcium aluminum silicate), stilbite (hydrated sodium calcium aluminum silicate), thomsonite (hydrated sodium calcium aluminum silicate), and the like. Zeolites have many related phosphate and silicate minerals with cage-like framework structures or with similar properties as zeolites, which may also be used in place of, or along with, zeolites. These zeolite-like minerals include minerals such as kehoeite, pahasapaite, tiptopite, hsianghualite, lovdarite, viseite, partheite, prehnite, roggianite, apophyllite, gyrolite, maricopaite, okenite, tacharanite, tobermorite, and the like.

Processes for making a dry-scrubbing media composition are known. For example, a mixture of activated alumina, magnesium oxide and a liquid can be formed into at least one cohesive unit, and the cohesive unit cured at an elevated temperature, preferably 100-225° F. for at least one hour. Preferably, a dry feed mix is made of the activated alumina and magnesium oxide, and the dry feed mix is tumbled or rolled while being sprayed with a liquid, for example water. The dry feed mix may further include powdered activated carbon.

Heating the impregnating solution prior to rolling the pellets in a tumble mill appears to allow the pellets to begin curing immediately, yielding better physical characteristics than an impregnating solution applied at room temperature. This can be achieved using a solution temperature between about room temperature and the boiling point of the solution. A preferred solution temperature is about 50° F. to about 200° F.

The amount of moisture present in the composition will depend on several factors, related primarily to the characteristics of the activated alumina being treated. The desired moisture content of the composition is readily obtained by spraying the dry mix ingredients while they roll on the mixer, in accordance with the method of U.S. Pat. No. 3,226,332, the entire contents of which are incorporated herein in their entirety.

Impregnation of the dry scrubbing media may be carried out in any manner which effectively produces an adsorbent of about 0.1% to about 15% by weight of impregnate formed by using a solution of about 0.3% to about 40% impregnate. Impregnation may be carried out simply by soaking the combinations in one volume of impregnate solution. The time required to produce the desired impregnation level is dependent upon the impregnate employed, and will only be as much time as is needed for the impregnate to penetrate the combinations. Additionally, the impregnate solution may be heated prior to use, for example during preparation of a dry-mix or during a tumbling/rolling process.

For example, impregnation with a hydroxide may be carried out by using a solution of about 3% to about 20% sodium hydroxide or potassium hydroxide. The resulting pellet should contain from about 1% to about 10% by weight hydroxide. Impregnation with other suitable impregnates also may be carried out in any manner that effectively produces an adsorbent of about 1% to about 10% by weight of impregnate, formed by using a solution of up to about 40% impregnate.

Alternatively, the impregnate solution may be passed through the media rather than being used in a static immersion treatment.

Additionally, the dry-scrubbing media may be formed by extrusion to form a matrix or honeycomb structure. The formation of channels and pores in a matrix creates a large surface area for chemical reactions to occur between contaminants in an air-stream and the surface of the dry-scrubbing media.

Such media, and methods for making the media, are described in several patent publications, including International application publication Nos. WO 2004/047950 and WO 2008/067521 and U.S. patent application publication No. 2009/0246107 the entire contents of which are incorporated herein in their entirety.

The methods for making the media described above and in the references incorporated herein result generate a significant amount of waste. For example, fines, oversized media, and waste from the equipment used to form the media (such as extruders and pelletizers) can account for waste of up to 10% or more as compared to the starting materials.

This waste media, because it has been treated with water during the manufacturing process, has already gone through the hydration process and has been inactivated. As a result, it cannot be re-used in the pelletization or extrusion process because it will not stick together as a cohesive unit. The waste media could be regenerated by heating it in a kiln, but this is a costly step that is typically not carried out in commercial processes. Accordingly, this waste media is typically disposed of in landfills. The cost of the unusable/wasted media and the costs for transporting and disposing of the waste media in a landfill can account for hundreds of thousands of dollars in annual loss in large-scale production facilities.

For at least these reasons, it would be desirable to have a low-cost option for re-using the waste media generated during these processes so as to minimize the need to send this waste to a landfill.

SUMMARY OF THE INVENTION

In one embodiment, a method for forming a filtration media from waste media includes combining the waste media with a binder to form a dry mixture; adding a liquid composition to the dry mixture to form a slurry; and extruding the slurry to form a filtration media.

The waste media may include a substrate such as activated alumina, silica gel, zeolite, adsorbent clay, activated bauxite and combinations thereof and an impregnate such as sodium permanganate, magnesium permanganate, calcium permanganate, barium permanganate, lithium permanganate, magnesium oxide, sodium hydroxide and combinations thereof.

The waste media may comprise fines or oversized media resulting from a prior media production process and that has bee subjected to a hydration process.

In certain embodiments, the waste media, prior to being combined with the binder, is prepared by grinding and sizing the waste media. The waste media may be ground in a ball mill or a jet mill to a size of 325 mesh or smaller.

In other embodiments, the binder is selected from the group consisting of clay, cellulose materials, and combinations thereof. The clay may be ball clay, bentonite, magnesium alumino silicate, attapulgite and combinations thereof. The cellulose materials may be methylcellulose fibers, ethylcellulose fibers and combinations thereof.

In yet other embodiments, the dry mixture is from about 50-90% by weight waste media and from about 10-50% by weight binder. In still other embodiments, the dry mixture is from about 70-90% by weight waste media and from about 10-30% by weight binder. In further embodiments, the dry mixture is about 80% by weight waste media and about 20% by weight binder.

In one embodiment, the liquid composition comprises water. In other embodiments, liquid composition further includes one or more additional additives selected from the group consisting of permanganates, acids, bases, amines and combinations thereof. In yet other embodiments, the liquid composition further includes one or more additional additives selected from the group consisting of sodium permanganate, magnesium permanganate, calcium permanganate, barium permanganate, lithium permanganate, phosphoric acid, citric acid, potassium hydroxide, sodium hydroxide, magnesium hydroxide, magnesium oxide, potassium carbonate, trimethylamine, triethylamine and combinations thereof.

In some embodiments the slurry may include from about 20-60% by weight liquid composition and from about 80-40% by weight dry mixture. In further embodiments the slurry may include from about 40-60% by weight liquid composition and from about 60-40% by weight dry mixture.

In other embodiments, the slurry is extruded into a cylindrical form or a honeycomb matrix. In further embodiments the slurry is extruded into a honeycomb matrix having from about 100 to 600 cells per inch.

In yet other embodiments the filtration media may be cured at a temperature of from about 50-100° C. in air having a relative humidity of from about 25-100% for about 1-24 hours.

DETAILED DESCRIPTION OF THE INVENTION

In one embodiment, waste media generated during the manufacturing process of chemical media for gas phase filtration applications is recycled. The waste media is rendered suitable for use as recycled media by combining the waste media with a binder to form a dry mixture, adding a liquid to this mixture to form a slurry, and extruding the slurry to form a filtration media.

The waste media can contain any of the various substrate compounds described above and the impregnates contained therein. Exemplary compounds that comprise the waste media composition include alumina, carbon, sodium bicarbonate, magnesium oxide, sodium permanganate, potassium permanganate and combinations thereof.

If necessary, the waste media is prepared prior to combining it with the binder. Such preparation can include, as applicable, collecting the waste media, grinding the waste media and sizing the waste media. The waste media need only be ground if it is not already in powdered or fine form. For example, oversize waste media from filtration media formation cannot easily be processed and thus should be ground prior to continued processing. The grinding process can be performed using, for example, a ball mill or a jet mill. The waste media is preferably ground until a substantial portion of the waste media has a particle size of 325 mesh or smaller.

The ground waste media can then be sized so that the waste media will properly bind and form an recycled filtration media having the desirable consistency. In an exemplary embodiment, the waste media is sized to a mesh of 325 or smaller. More preferably, the waste media is sized to a mesh of 325 or smaller (i.e., the waste media has a particle size of less than about 44 microns).

As discussed, a binder is added to the waste media to form a dry mixture. Suitable binders include clay, cellulose materials, and combinations thereof. Exemplary types of clay materials include ball clay (available from, e.g., Kentucky-Tennessee Clay Company, Kentucky), bentonite (available from, e.g., American Colloid Co., Illinois), magnesium alumino silicate (such as Acti-Gel, available from Active Minerals Corp., Florida) and attapulgite (fuller's earth) (such as MicroSorb, available from BASF Chemicals). Suitable cellulose materials include, but are not limited to, cellulose fibers such as methylcellulose and ethylcellulose fibers (available from, e.g., Dow Chemical Co.).

About 50-90% by weight waste media is preferably combined with about 10-50% by weight binder to form the dry mixture. In another embodiment, about 70-90% by weight waste media is combined with about 10-30% by weight binder to form the dry mixture. Higher binder levels will lower the cost of the finished filtration media, but will also reduce the filtration efficiency of the media. Conversely, lower binder levels will increase the cost of the filtration media but will result in a filtration media having a greater filtration capacity. In one embodiment, the dry mixture contains about 80% by weight waste media and about 20% by weight binder.

As discussed, a liquid composition is added to the dry mixture to form a slurry. The liquid imparts plasticity to the dry mixture, which would otherwise be difficult to extrude. The liquid composition preferably includes water and can optionally include one or more additional additives. Exemplary additional additives include permanganates, acids, bases and amines, and can be added to increase the concentration of any one of these additives in the extruded filtration media or to provide the media with these additives if they were not present in the original waste media. The choice of additive(s) is dependent on the filtration requirements of the finished media—for example, an acidic additive can be added to provide the finished filtration media with the ability to remove basic contaminants, and a basic additive can be added to provide the finished filtration media with the ability to remove acidic contaminants.

Waste media containing sodium permanganate, for example, may not provide sufficient sodium permanganate in the dry mixture to result in an extruded filtration media having a desired contaminant removal efficiency. In such an instance, additional sodium permanganate impregnate can be added to the water in the liquid composition so that the liquid composition, when mixed with the dry mixture to form a slurry and extruded, will form a filtration media with the desired sodium permanganate composition.

Specific examples of suitable additional additives include, but are not limited to, sodium permanganate, magnesium permanganate, calcium permanganate, barium permanganate, lithium permanganate, phosporic acid, citric acid, potassium hydroxide, sodium hydroxide, magnesium hydroxide, magnesium oxide, potassium carbonate, trimethylamine, triethylamine and combinations thereof.

Additional additives could also be added to the liquid composition. One category of additional liquid additives includes liquid binders, such as liquid acrylics, which could be added to further improve the ability of the waste media to bind with the clay materials in the dry mixture.

The liquid composition can be added to the dry mixture in any amount that will result in a slurry that is extrudable into the desired form for the finished filtration media. For example, the slurry can contain about 20-60% by weight liquid composition and about 80-40% by weight dry mixture. In another embodiment, the slurry can contain about 40-60% by weight liquid composition and about 60-40% by weight dry mixture.

The filtration media is formed by extruding the slurry containing the dry mixture and liquid composition using a ram, screw or twin screw extruder. The filtration media can be extruded into any suitable form, such as a cylindrical form or a honeycomb matrix. Due to the large surface area and good gas flow characteristics, a honeycomb matrix is particularly preferable. In one embodiment, a honeycomb matrix having from about 100 to 600 cells per inch is formed from the extrusion.

If desired, the extruded filtration media is cured to remove excess water. Curing the filtration media can further set the form of the media and can increase the available surface area of the media, as the physical movement of retained moisture out of the media causes pores to develop in the media. The curing step can thus improve the porosity and ultimately the removal capacity of the media. If used, the curing step is preferably carried out in a humidity controlled environment to control the cure rate and minimize cracking of the media.

In one embodiment, the filtration media is cured at a temperature of from about 50-100° C. in air having a relative humidity of from about 25-100% for about 1-24 hours. The media can be cured longer than this if desired (for example as dictated by production schedules). A typical curing cycle is 4-6 hours.

Waste media that would have previously been discarded (because it has already gone through the hydration process and been inactivated) can thus be incorporated into a useful filtration media according to the processes described above.

It should be understood, of course, that the foregoing relates only to certain embodiments of the present invention and that numerous modifications or alterations may be made therein without departing from the spirit and the scope of the invention. All of the publications or patents mentioned herein are hereby incorporated by reference in their entireties.

I claim:

1. A method for forming a filtration media from waste media comprising: combining the waste media with a binder to form a dry mixture; adding a liquid composition to the dry mixture to form a slurry; and extruding the slurry to form a filtration media.

2. The method of claim 1, wherein the waste media comprises a substrate and an impregnate.

3. The method of claim 2, wherein the substrate comprises one or more of activated alumina, silica gel, zeolite, adsorbent clay or activated bauxite.

4. The method of claim 2, wherein the impregnate comprises one or more of sodium permanganate, magnesium permanganate, calcium permanganate, barium permanganate, lithium permanganate, magnesium oxide or sodium hydroxide.

5. The method of claim 1, wherein the waste media comprises fines or oversized media resulting from a prior media production process and has been subjected to a hydration process.

6. The method of claim 1, wherein the waste media, prior to being combined with the binder, is prepared by grinding and sizing the waste media.

7. The method of claim 6, wherein the waste media is ground in a ball mill or a jet mill.

8. The method of claim 6, wherein the waste media is ground to a size of 325 mesh or smaller.

9. The method of claim 1, wherein the binder is selected from the group consisting of clay, cellulose materials, and combinations thereof.

10. The method of claim 9, wherein the clay is selected from the group consisting of ball clay, bentonite, magnesium alumino silicate, attapulgite and combinations thereof.

11. The method of claim 9, wherein the cellulose materials are selected from the group consisting of methylcellulose fibers, ethylcellulose fibers and combinations thereof.

12. The method of claim 1, wherein the dry mixture comprises from about 50-90% by weight waste media and from about 10-50% by weight binder.

13. The method of claim 1, wherein the dry mixture comprises about 80% by weight waste media and about 20% by weight binder.

14. The method of claim 1, wherein the liquid composition comprises water.

15. The method of claim 14, wherein the liquid composition further comprises one or more additional additives selected from the group consisting of permanganates, acids, bases, amines and combinations thereof.

16. The method of claim 14, wherein the liquid composition further comprises one or more additional additives selected from the group consisting of sodium permanganate, magnesium permanganate, calcium permanganate, barium permanganate, lithium permanganate, phosphoric acid, citric acid, potassium hydroxide, sodium hydroxide, magnesium hydroxide, magnesium oxide, potassium carbonate, trimethylamine, triethylamine and combinations thereof.

17. The method of claim 1, wherein the slurry comprises from about 20-60% by weight liquid composition and from about 80-40% by weight dry mixture.

18. The method of claim 1, wherein the slurry is extruded into a cylindrical form or a honeycomb matrix.

19. The method of claim 1, wherein the slurry is extruded into a honeycomb matrix having from about 100 to 600 cells per inch.

20. The method of claim 1, wherein the filtration media is cured at a temperature of from about 50-100° C. in air having a relative humidity of from about 25-100% for about 1-24 hours.

* * * * *